(12) United States Patent
Jang

(10) Patent No.: US 9,557,903 B2
(45) Date of Patent: Jan. 31, 2017

(54) METHOD FOR PROVIDING USER INTERFACE ON TERMINAL

(75) Inventor: Seokbok Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 200 days.

(21) Appl. No.: 14/376,384

(22) PCT Filed: Feb. 13, 2012

(86) PCT No.: PCT/KR2012/001050
§ 371 (c)(1),
(2), (4) Date: Aug. 1, 2014

(87) PCT Pub. No.: WO2013/122269
PCT Pub. Date: Aug. 22, 2013

(65) Prior Publication Data
US 2014/0359523 A1    Dec. 4, 2014

(51) Int. Cl.
*G06F 3/048* (2013.01)
*G06F 3/0484* (2013.01)
(Continued)

(52) U.S. Cl.
CPC .......... *G06F 3/04842* (2013.01); *G06F 3/167* (2013.01); *G06F 17/30554* (2013.01);
(Continued)

(58) Field of Classification Search
CPC ....................................................... G06F 3/167
(Continued)

(56) References Cited

U.S. PATENT DOCUMENTS 8,311,838 B2 * 11/2012 Lindahl ................... G06F 3/167
704/231
8,682,667 B2 * 3/2014 Haughay ................ G10L 15/22
704/246
(Continued)

FOREIGN PATENT DOCUMENTS

JP          2003-281173      10/2003
KR      10-2002-0079121      10/2002
(Continued)

OTHER PUBLICATIONS

PCT International Application No. PCT/KR2012/001050, Written Opinion of the International Searching Authority dated Sep. 21, 2012, 1 page.

*Primary Examiner* — William Titcomb
(74) *Attorney, Agent, or Firm* — Lee Hong Degerman Kang Waimey

(57) ABSTRACT

The present invention relates to a method for providing a user interface on a terminal, which provides a user interactive information search service that uses, as information, a user response to an information search request so as to overcome local limitations coverable by an information search service and expand a search function for the domain that cannot be supported. A method for providing a user interface on a terminal according to one embodiment disclosed in the present specification comprises a step of transmitting, to a server, an information search request based on a user voice input; a step of receiving, from the server, a response to the information search request; and a step of displaying an item to take, in the form of a voice input, a user response to the information search request in the event that the response indicates that there is nothing found as a search result.

20 Claims, 20 Drawing Sheets

(51) Int. Cl.
  *G06F 3/16* (2006.01)
  *G06F 17/30* (2006.01)
  *G10L 15/26* (2006.01)
  *H04M 1/725* (2006.01)

(52) U.S. Cl.
  CPC ......... *G10L 15/26* (2013.01); *H04M 1/72561* (2013.01); *H04M 1/72569* (2013.01); *H04M 1/72572* (2013.01)

(58) Field of Classification Search
  USPC ........................................................ 715/781
  See application file for complete search history.

(56) References Cited

U.S. PATENT DOCUMENTS

| | | | | |
|---|---|---|---|---|
| 8,898,568 | B2* | 11/2014 | Bull | G06F 3/167 381/61 |
| 9,116,989 | B1* | 8/2015 | Ehlen | G06F 17/30554 |
| 9,171,105 | B2* | 10/2015 | Kim | G06F 17/30997 |
| 9,311,043 | B2* | 4/2016 | Rottler | G06F 3/0482 |
| 9,318,108 | B2* | 4/2016 | Gruber | G10L 15/1815 |
| 2008/0114747 | A1* | 5/2008 | Goller | G06F 17/30637 |
| 2010/0069123 | A1* | 3/2010 | Araradian | G06F 1/1626 455/566 |
| 2010/0105364 | A1* | 4/2010 | Yang | G06F 17/30663 455/414.1 |
| 2012/0016678 | A1* | 1/2012 | Gruber | G06F 17/3087 704/275 |
| 2012/0036151 | A1* | 2/2012 | Jitkoff | G06F 3/167 707/769 |
| 2013/0167175 | A1* | 6/2013 | Jang | H04N 21/43615 725/40 |

FOREIGN PATENT DOCUMENTS

| | | |
|---|---|---|
| KR | 10-2003-0012284 | 2/2003 |
| KR | 10-0494113 | 6/2005 |

* cited by examiner

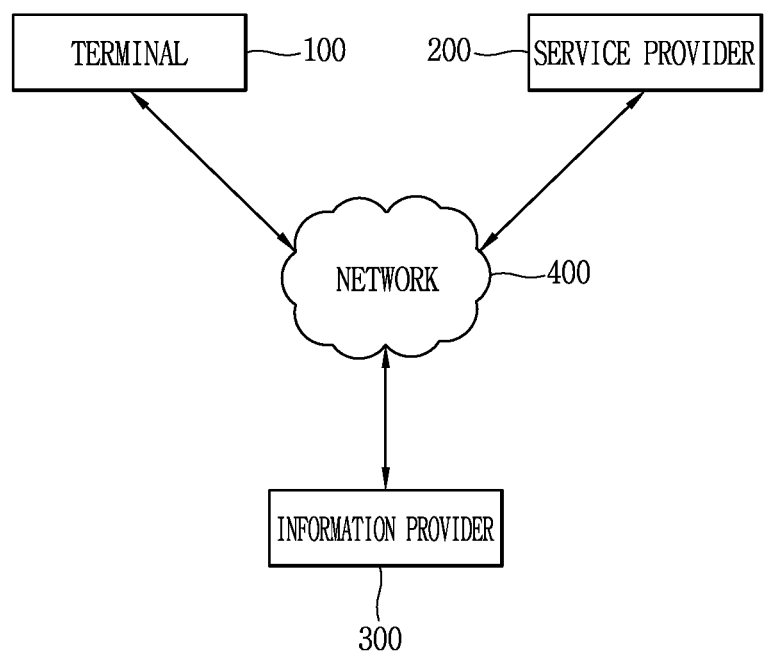

METHOD FOR PROVIDING USER INTERFACE ON TERMINAL

CROSS-REFERENCE TO RELATED APPLICATIONS

This application is the National Stage filing under 35 U.S.C. 371 of International Application No. PCT/KR2012/001050, filed on Feb. 13, 2012, the contents of which are all hereby incorporated by reference herein in its entirety.

TECHNICAL FIELD

The present disclosure relates to a method of providing a user interface on a terminal, and more particularly, to a method of providing an interface allowing a terminal to enter a user response to an information search request.

BACKGROUND ART

Terminals can be classified into two types, such as a mobile/portable terminal and a stationary terminal based on its mobility. Furthermore, the mobile terminal can be further classified into two types, such as a handheld terminal and a vehicle mount terminal based on whether or not it can be directly carried by a user.

As it becomes multifunctional, for example, such a terminal is allowed to capture still images or moving images, play music or video files, play games, receive broadcast and the like, so as to be implemented as an integrated multimedia player. Moreover, improvements in the aspect of structure and software of such as terminal may be taken into consideration to support and enhance the functions of the terminal.

For an example, a terminal may receive an information search request from a user as a voice to provide the corresponding search result through a dedicated search service. However, since information providers providing information to the dedicated search service are limited, it may occur a case where there is no search result or the search result cannot be provided. In this case, the terminal may provide an interface capable of receiving a search result through exception handling, but such a web-based search result is inaccurate and not useful, thus having a low degree of usage.

DISCLOSURE OF THE INVENTION

An embodiment disclosed in the present disclosure relates to a method of a user interface on a terminal in which a user interactive information search service using user responses to an information search request is provided, thereby overcoming geographical limitations that can be covered by the information search service as well as extending a search function for unsupported domains.

A method of providing a user interface on a terminal according to an embodiment disclosed in the present disclosure may include transmitting an information search request based on a user's voice input to a server; receiving a response to the information search request from the server; and displaying an item for receiving a user response to the information search request as a voice when the response indicates no search result.

According to an embodiment, the item may be an item for receiving a user response to the information search request as a voice from the user while at the same time receiving a web search result to the information search request from the server.

Furthermore, according to an embodiment, the method of providing a user interface on a terminal may further include displaying an item for receiving a web search result to the information search request from the server.

Furthermore, according to an embodiment, the method of providing a user interface on a terminal may further include receiving a user response to the information search request as a voice from the user.

Furthermore, according to an embodiment, said receiving the user response as a voice may include providing an interactive interface when the item is selected; and receiving a second response to the information search request as a voice from the user through the interactive interface.

Furthermore, according to an embodiment, the method of providing a user interface on a terminal may further include transmitting a user response received from the user to the server.

Furthermore, according to an embodiment, the method of providing a user interface on a terminal may further include acquiring at least one of location information and time information of the terminal; and transmitting at least one of location information and time information of the terminal to the server.

Furthermore, according to an embodiment, the method of providing a user interface on a terminal may further include acquiring a user's profile information; and transmitting the user's profile information to the server.

Furthermore, according to an embodiment, the user response to the information search request may include information itself requested by the information search request or information linked to information requested by the information search request.

Furthermore, according to an embodiment, the method of providing a user interface on a terminal may further include transmitting the information search request to an external terminal when the item is selected; and receiving a user response to the information search request from the external terminal.

On the other hand, a method of providing a user interface on a terminal according to another embodiment disclosed in the present disclosure may include displaying at least one information search request for which a response to the information search request from a server indicates no search result; receiving a user response to the at least one information search request as a voice from a user; and transmitting the received user response to the server.

According to an embodiment, the information search request may be received as a voice from the user.

Furthermore, according to an embodiment, the method of providing a user interface on a terminal may further include transmitting the received information search request to the server, and receiving a response to the information search request from the server when the information search request is received as a voice from the user; and storing an information search request received as a voice from the user when a response to the received information search request indicates no search result.

Furthermore, according to an embodiment, the information search request may be received from an external terminal.

Furthermore, according to an embodiment, the information search request may be received from the external terminal using a push notification service.

According to an embodiment disclosed in the present disclosure, a terminal may provide an information search service using a user response to an information search request through a voice interface, thereby overcoming the limitation of specified information providers, and enhancing the level of satisfaction for the provided information. Furthermore, inputs and searches may be carried out through an interactive service, and thus there exists an advantage in which a user's learning effort is almost not required in implementing such as function.

BRIEF DESCRIPTION OF THE DRAWINGS

FIG. 3 is a block diagram illustrating an information search system according to the related art.

MODES FOR CARRYING OUT THE PREFERRED EMBODIMENTS

Figure 1:
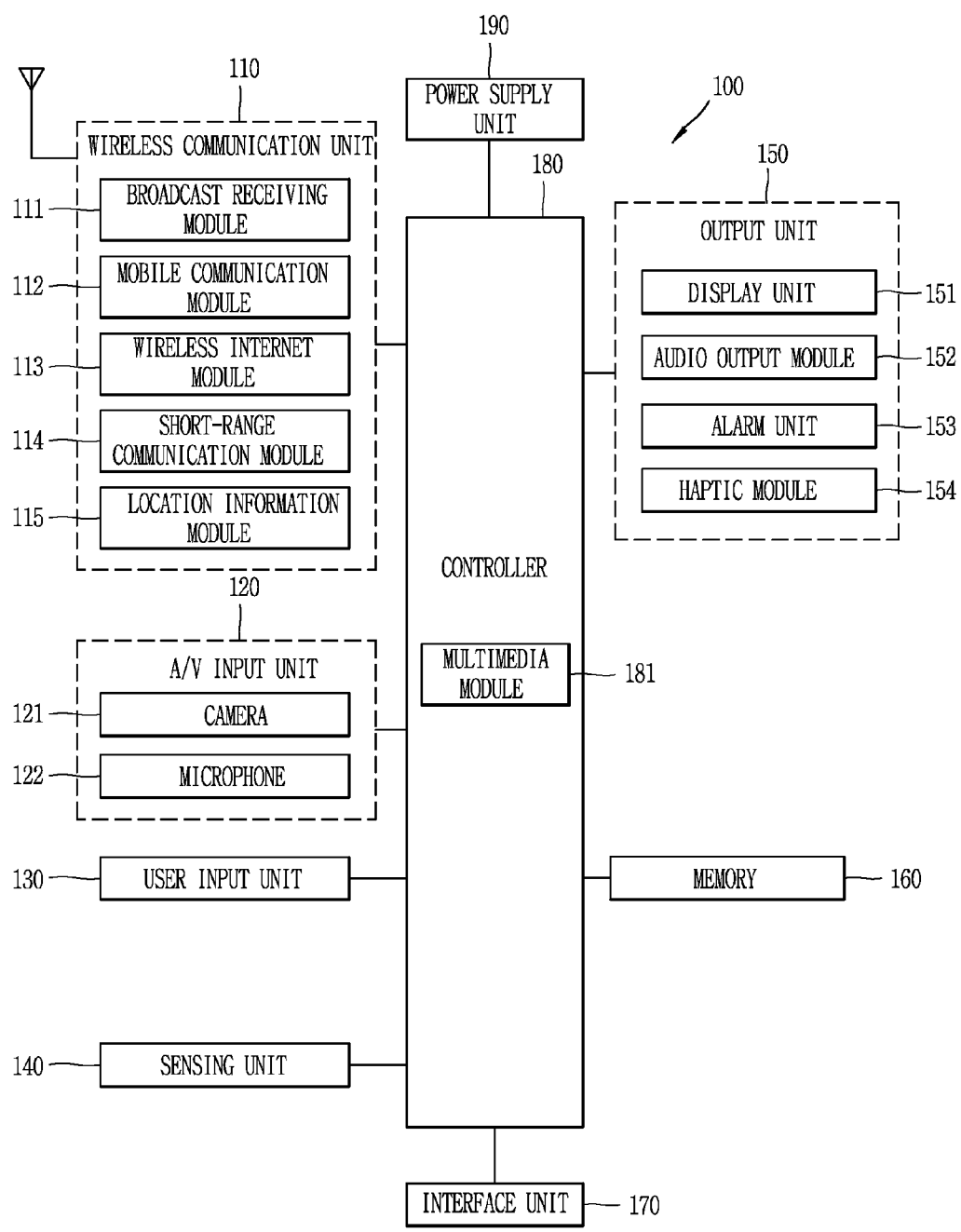
FIG. 1 is a block diagram illustrating a mobile terminal 100 associated with the present disclosure.

Hereinafter, preferred embodiments of the present invention will be described in detail with reference to the accompanying drawings to such an extent that the present invention can be easily embodied by a person having ordinary skill in the art to which the present invention pertains. However, the present invention may be implemented in various different forms, and therefore, the present invention is not limited to the illustrated embodiments. In order to clearly describe the present invention, parts not related to the description are omitted, and like reference numerals designate like constituent elements throughout the specification.

A mobile terminal disclosed herein may include a portable phone, a smart phone, a laptop computer, a digital broadcast mobile device, a personal digital assistant (PDA), a portable multimedia player (PMP), a navigation, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 associated with the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the constituent elements 110-190 of the mobile terminal 100 will be described in sequence.

The wireless communication unit 110 may include one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast associated information may mean information regarding a broadcast channel, a broadcast program, a broadcast service provider, and the like. The broadcast associated information may also be provided through a mobile communication network. In this case, the broadcast associated information may be received by the mobile communication module 112. The broadcast signal and broadcast-associated information received through the broadcast receiving module 111 may be stored in the memory 160.

The mobile communication module 112 transmits and/or receives a radio signal to and/or from at least one of a base station, an external terminal and a server over a mobile communication network. The radio signal may include a voice call signal, a video call signal or various types of data according to text and/or multimedia message transmission and reception.

The wireless Internet module 113 as a module for supporting wireless Internet access may be built-in or externally installed to the mobile terminal 100. A variety of wireless Internet access techniques may be used, such as WLAN (Wireless LAN), Wi-Fi, Wibro (Wireless Broadband), Wimax (World Interoperability for Microwave Access), HSDPA (High Speed Downlink Packet Access), and the like.

The short-range communication module 114 refers to a module for supporting a short-range communication. A variety of short-range communication technologies may be used, such as Bluetooth, Radio Frequency IDentification (RFID), Infrared Data Association (IrDA), Ultra WideBand (UWB), ZigBee, and the like.

The location information module 115 is a module for acquiring a location of the mobile terminal 100, and there is a GPS module as a representative example.

Subsequently, referring to FIG. 1, the A/V (audio/video) input unit 120 receives an audio or video signal, and the A/V (audio/video) input unit 120 may include a camera 121, a microphone 122, and the like. The camera 121 processes an image frame, such as still or moving images, obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated during the process of receiving the external audio signal.

The user input unit 130 may generate input data to control an operation of the mobile terminal 100. The user input unit 130 may be configured with a keypad, a dome switch, a touch pad (pressure/capacitance), a jog wheel, a jog switch, and the like.

The sensing unit 140 detects presence or absence of the user's contact, and a current status of the mobile terminal 100 such as an opened or closed configuration, a location of the mobile terminal 100, an orientation of the mobile terminal 100, an acceleration or deceleration of the mobile terminal 100, and the like, and generates a sensing signal for controlling the operation of the mobile terminal 100. For example, when the mobile terminal 100 is a slide phone type, the sensing unit 140 may sense an opened or closed configuration of the slide phone. Furthermore, the sensing unit 140 may sense whether or not power is supplied from the power supply unit 190, or whether or not an external device is coupled to the interface unit 170.

The sensing unit 140 may include a proximity sensor 141. Furthermore, the sensing unit 140 may include a touch sensor (not shown) for sensing a touch operation with respect to the display unit 151.

The touch sensor may be implemented as a touch film, a touch sheet, a touch pad, and the like. The touch sensor may be configured to convert changes of a pressure applied to a specific part of the display unit 151, or a capacitance generated from a specific part of the display unit 151, into electric input signals. The touch sensor may be configured to sense not only a touched position and a touched area, but also a touch pressure.

When the touch sensor and display unit 151 forms an interlayer structure, the display unit 151 may be used as an input device rather than an output device. The display unit 151 may be referred to as a "touch screen".

When there is a touch input through the touch screen, the corresponding signals may be transmitted to a touch controller (not shown). The touch controller processes signals transferred from the touch sensor, and then transmits data corresponding to the processed signals to the controller 180. Accordingly, the controller 180 may sense which region of the display unit 151 has been touched.

When the touch screen is a capacitance type, the proximity of a sensing object may be detected by changes of an electromagnetic field according to the proximity of a sensing object. The touch screen may be categorized into a proximity sensor 141.

The proximity sensor 141 refers to a sensor for detecting the presence or absence of a sensing object using an electromagnetic field or infrared rays without a mechanical contact. The proximity sensor 141 has a longer lifespan and more enhanced utility than a contact sensor. The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like.

Hereinafter, for the sake of convenience of explanation, the behavior of a sensing object being placed in proximity with the touch screen without being brought into contact with the touch screen may be referred to as a "proximity touch", whereas the behavior of a sensing object being brought into contact with the touch screen may be referred to as a "contact touch".

The proximity sensor 141 may sense the presence or absence of a proximity touch and a proximity touch pattern (for example, a proximity touch distance, a proximity touch direction, a proximity touch velocity, a proximity touch time, a proximity touch position, a proximity touch moving state, etc.) Information corresponding to the presence or absence of a proximity touch and the proximity touch pattern may be displayed on the touch screen.

The output unit 150 may generate an output associated with visual, auditory, tactile senses. The output unit 150 may include a display unit 151, an audio output module 152, an alarm unit 153, a haptic module 154, and the like.

The display unit 151 may display (output) information processed in the mobile terminal 100. For example, when the mobile terminal 100 is operated in a phone call mode, the display unit 151 may display a user interface (UI) or graphic user interface (GUI) associated with a phone call. When the mobile terminal 100 is operated in a video call mode or image capturing mode, the display unit 151 may display a captured image, a received image, UI, GUI, or the like.

The display unit 151 may include at least one of a liquid crystal display (LCD), a thin film transistor-liquid crystal display (TFT-LCD), an organic light emitting diode (OLED) display, a flexible display, a three-dimensional (3D) display, and an e-ink display.

At least one of those displays (or display devices) included in the display unit 151 may be configured with a transparent or optical transparent type to allow the user to view the outside therethrough. It may be referred to as a transparent display. A representative example of the transparent display may be a transparent OLED (TOLED), and the like. Under this configuration, the user can view an object positioned at a rear side of the mobile device body through a region occupied by the display unit 151 of the mobile device body.

There may exist two or more display units 151 according to the implementation of the mobile terminal 100. For example, a plurality of the display units 151 may be placed on one surface in a separate or integrated manner, or may be place on different surfaces, respectively.

The audio output module 152 may output audio data received from the wireless communication unit 110 or stored in the memory 160, in a call-receiving mode, a call-placing mode, a recording mode, a voice recognition mode, a broadcast reception mode, and the like. The audio output module 152 may output an audio signal associated with a function carried out in the mobile terminal 100 (for example, sound alarming a call received or a message received, and the like). The audio output module 152 may include a receiver, a speaker, a buzzer, and the like.

The alarm unit 153 outputs signals notifying the occurrence of an event from the mobile terminal 100. The examples of an event occurring from the mobile terminal 100 may include a call received, a message received, a key signal input, a touch input, and the like. The alarm unit 153 may output not only video or audio signals, but also other types of signals such as signals for notifying the occurrence of an event in a vibration manner. Since the video or audio signals may be also output through the display unit 151 or the audio output unit 153, the display unit 151 and the audio output module 152 may be categorized into part of the alarm unit 153.

The haptic module 154 generates various tactile effects that can be felt by the user. A representative example of the tactile effects generated by the haptic module 154 may include vibration. Vibration generated by the haptic module 154 may have a controllable intensity, a controllable pattern, and the like. For example, different vibrations may be output in a synthesized manner or in a sequential manner.

The haptic module 154 may generate various tactile effects, including not only vibration, but also arrangement of pins vertically moved with respect to a skin surface being touched, air injection force or air suction force through an injection port or suction port, touch by a skin surface, contact with an electrode, effects by stimulus such as an electrostatic force, reproduction of cold or hot feeling using a heat absorbing device or heat emitting device, and the like.

The haptic module 154 may be configured to transmit tactile effects through the user's direct contact, or the user's muscular sense using a finger or a hand. Two or more haptic modules 154 may be provided according to the configuration of the mobile terminal 100.

The memory 160 may store a program for operating the controller 180, or temporarily store input/output data (for example, phonebooks, messages, still images, moving images, and the like). The memory 160 may store data related to various patterns of vibrations and sounds outputted when performing a touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

The interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize a handwriting or drawing input on the touch screen as text or image.

The power supply unit 190 may receive external or internal power to provide power required by various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Hereinafter, the method of processing a user input to the mobile terminal 100 will be described.

The user input unit 130 is manipulated to receive a command for controlling the operation of the mobile terminal 100, and may include a plurality of manipulation units. The manipulation units may be commonly designated as a manipulating portion, and any method may be employed if it is a tactile manner allowing the user to perform manipulation with a tactile feeling.

Various kinds of visual information may be displayed on the display unit 151. The visual information may be displayed in the form of a character, a numeral, a symbol, a graphic, an icon, and the like. For an input of the visual information, at least one of a character, a numeral, a symbol, a graphic, and an icon may be displayed with a predetermined arrangement so as to be implemented in the form of a keypad. Such a keypad may be referred to as a so-called "soft key."

The display unit 151 may operate on an entire region or operate by dividing into a plurality of regions. In case of the latter, the plurality of regions may be configured to operate in an associative way. For example, an output window and an input window may be displayed on the upper and lower portions of the display unit 151, respectively. The output window and the input window may be regions allocated to output or input information, respectively. A soft key on which numerals for inputting a phone number or the like are displayed is outputted on the input window. When the soft key is touched, a numeral corresponding to the touched soft key is displayed on the output window. When the first manipulating unit is manipulated, a phone call connection for the phone number displayed on the output window will be attempted or a text displayed on the output window will be entered to the application.

The display unit 151 or touch pad may be configured to sense a touch scroll. The user may move an object displayed on the display unit 151, for example, a cursor or pointer placed on an icon or the like, by scrolling the display unit 151 or touch pad. Moreover, when a finger is moved on the display unit 151 or touch pad, a path being moved by the finger may be visually displayed on the display unit 151. It may be useful to edit an image displayed on the display unit 151.

In order to cope with a case where the display unit 151 and touch pad are touched together within a predetermined period of time, one function of the terminal 100 may be implemented. For the case of being touched together, there is a case when the user clamps a body of the mobile terminal 100 using his or her thumb and forefinger. For one of the above functions implemented in the mobile terminal 100, for example, there may be an activation or de-activation for the display unit 151 or touch pad.

Figure 2A:
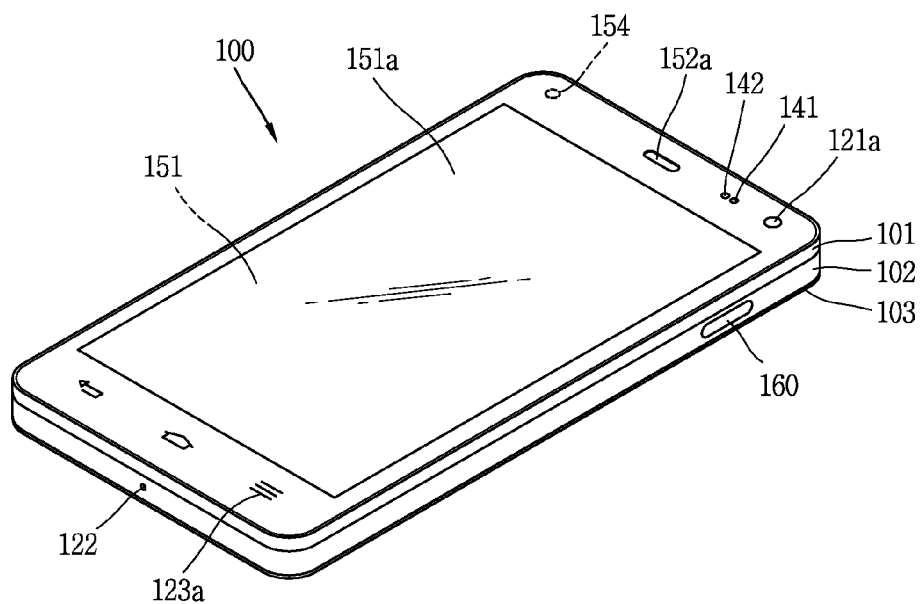
FIGS. 2A and 2B are perspective views illustrating an external appearance of the mobile terminal 100 associated with the present disclosure.
Figure 2B:
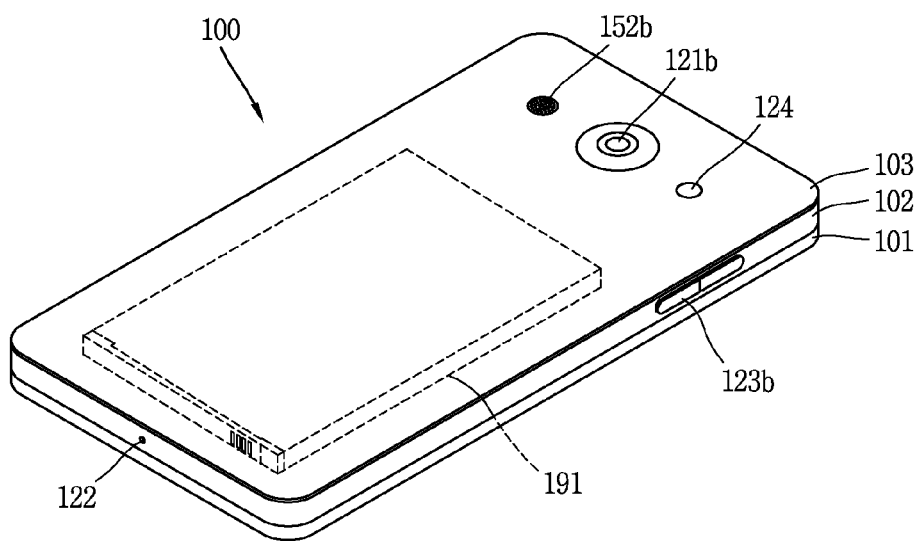

FIGS. 2A and 2B are perspective views illustrating an external appearance of the mobile terminal 100 associated with the present disclosure. FIG. 2A illustrates a front surface and a lateral surface of the mobile terminal 100, and FIG. 2B illustrates a rear surface and the other lateral surface of the mobile terminal 100.

Referring to FIG. 2A, the mobile terminal 100 is provided with a bar-type terminal body. However, the mobile terminal 100 is not only limited to this type of terminal, but also applicable to various structures of terminals such as a slide type, a folder type, a swivel type, a swing type, and the like, in which two and more bodies are combined with each other in a relatively movable manner.

The terminal body includes a case (casing, housing, cover, etc.) forming an appearance of the terminal. In this embodiment, the case may be divided into a front case 101 and a rear case 102. Various electronic components are incorporated into a space formed between the front case 101 and the rear case 102. At least one middle case may be additionally disposed between the front case 101 and the rear case 102.

The cases may be formed by injection-molding a synthetic resin or may be also formed of a metal, for example, stainless steel (STS), titanium (Ti), or the like.

A display unit 151, an audio output module 152, a camera 121, a user input unit 130 (refer to FIG. 1), a microphone 122, an interface 170, and the like may be arranged on the terminal body, mainly on the front case 101.

The display unit 151 occupies most of the front case 101. The audio output unit 152 and the camera 121 are disposed on a region adjacent to one of both ends of the display unit 151, and the first user input unit 131 and the microphone 122 are disposed on a region adjacent to the other end thereof. The second user interface 132 and the interface 170, and the like, may be disposed on a lateral surface of the front case 101 and the rear case 102.

The user input unit 130 is manipulated to receive a command for controlling the operation of the portable terminal 100, and may include a plurality of manipulation units 131, 132.

The manipulation units 131, 132 may receive various commands. For example, the first manipulation unit 131 may receive a command, such as start, end, scroll, or the like. The second manipulation unit 132 may be used to receive a command, such as controlling a volume level being outputted from the audio output unit 152, switching it into a touch selection mode of the display unit 151, or the like.

Referring to FIG. 2B, a rear camera 121' may be additionally mounted on a rear surface of the terminal body, namely, the rear case 102. The rear camera 121' may be configured to have an image capturing direction opposite to that of the front camera 121 (refer to FIG. 2A), and have a different number of pixels from that of the front camera 121.

For example, the front camera 121 may be configured to have a low number of pixels, and the rear camera 121' may be configured to have a high number of pixels. Accordingly, if the front camera 121 is used during a video phone call, then the size of transmission data can be reduced when a user's face is captured and the captured image is transmitted in real time to the counterpart. On the contrary, the rear camera 121' may be used in order to store high image quality videos.

On the other hand, the cameras 121, 121' may be provided in the terminal body in a rotatable and popupable manner.

A flash 123 and a mirror 124 may be additionally disposed adjacent to the camera 121'. The flash 123 illuminates light toward an object when capturing the object with the camera 121'. The mirror 124 allows the user to look at his or her own face when capturing himself or herself (in a self-portrait mode) using the rear camera 121'.

An audio output unit 152' may be additionally disposed on a rear surface of the terminal body. The audio output unit 152' together with the audio output unit 152 (refer to FIG. 2a) can implement a stereo function, and implement a speaker phone mode during a phone call.

In addition to an antenna for making a call, an antenna 116 for receiving broadcast signals may be additionally disposed on a lateral surface of the terminal body. The antenna 116 constituting a broadcast receiving module 111 (refer to FIG. 1) may be provided in a drawable manner from the terminal body.

A power supply unit 190 for supplying power to the mobile terminal 100 may be mounted on a rear surface of the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be configured in an optical transmission type similarly to the display unit 151 (refer to FIG. 2A). Furthermore, a rear display unit for displaying visual information may be additionally mounted on the touch pad 135. Here, the information displayed on the both surfaces of the front display unit 151 and rear display unit may be controlled by the touch pad 135.

The touch pad 135 operates in a reciprocal relation to the display unit 151. The touch pad 135 may be disposed in parallel on a rear side of the display unit 151. The touch pad 135 may have the same or a smaller size as or than that of the display unit 151.

The mobile terminal 100 may be provided with a function for providing a search result corresponding to a query received from a user. When a text query is received through the user interface 130 from the user, the controller 180 may execute a text query in an embedded search engine to display a search result through the output unit 150. Alternatively, the wireless communication unit 110 may transmit a text query to a server through a network to execute it in an outside search engine, and receive a search result from the server to display it through the output unit 150. Furthermore, when a voice query is received from the user through the microphone 121, the controller 180 may convert the voice query into a text query to execute it in the foregoing search engine, thereby providing its search result to the user.

When a plurality of search results are returned from a search engine, each of the search results may be classified by their domains. In other words, search results may be linked to each domain, wherein a domain may be defined in advance as an index indicating a general category to which any search result can be linked. However, the domain may be newly generated according to an attribute of the search result even when it is not covered within a predefined range. The domain may be acquired by identifying meaning information associated with a subject contained in the search result. For example, various types of content may include metadata for identifying a meaning contained in the content, namely, an email address, a mail address or phone number, contact information such as a byname used in message services, and the like. The mobile terminal 100 may accompany a process of reading such meaning information from the metadata to match it to a predefined query domain.

Furthermore, a search engine may reflect the user's context and use history on a query to provide an optimal search result. For example, though a query like "What's the weather like today?" does not explicitly exhibit the weather in which area, the mobile terminal 100 may provide the weather of a region in which the user is located as a search result using the location information of the mobile terminal 100. Otherwise, though a query like "Execute my favorite game" does not explicitly exhibit which game to be executed, the mobile terminal 100 may analyze the execution time and/or execution frequency of a game to provide boxes for checking whether to execute a game which has been most frequently executed or execute a game which has been executed for a long period of time as a search result.

FIG. 3 is a block diagram illustrating an information search system according to the related art. The information search system according to the related art may include a mobile terminal 100, a service provider (service server) 200, an information provider (information server) 300, and a network 400.

According to the following description, information search request denotes a low data type voice or text for requesting the search of information such as "Let me know a good restaurant in the vicinity", and a query corresponding to the information search request denotes an analysis result ("restaurants at Gangnam Station") for which words from the information search request are detected and semantically analyzed and derived. Furthermore, executing a query denotes requesting a search result for a query to the database.

The mobile terminal 100 provides a user interface for information search. In other words, when an information search request is received from a voice input from a user, the mobile terminal 100 executes a query corresponding to the information search request to provide a search result to the user. The query may be executed by an internal search engine or executed by the service provider 200. When executed in the service provider 200, an information search request is transferred from the mobile terminal 100 to the service provider 200, and a search result for the query corresponding to the information search request is also transferred from the service provider 200 to the mobile terminal 100 though the network 400.

Upon receiving an information search request from the mobile terminal 100 through the network 400, the service provider 200 executes a query corresponding to the information search request, and receives a search result from the information provider 300 to transmit it to the mobile terminal 100. If there is no search result, then the service provider 200 transmits a message indicating that there is no search result to the mobile terminal 100 through the network 400.

The information provider 300 provides a dedicated database for the information search service. The dedicated database refers to a database generated and managed by the information provider 300. The dedicated database may be distinguished from a web database for web search services. For instance, when there is no search result for the dedicated database of a query received from the mobile terminal 100 through the network 400, the service provider 200 may transmit a message indicating that there is no search result, wherein the mobile terminal 100 may additionally display an item for web search while at the same time displaying no search result. When an item for web search is selected, the web server (not shown) may provide a search result for the web database (not shown) of a query corresponding to an information search request received from the mobile terminal 100.

Figure 4:
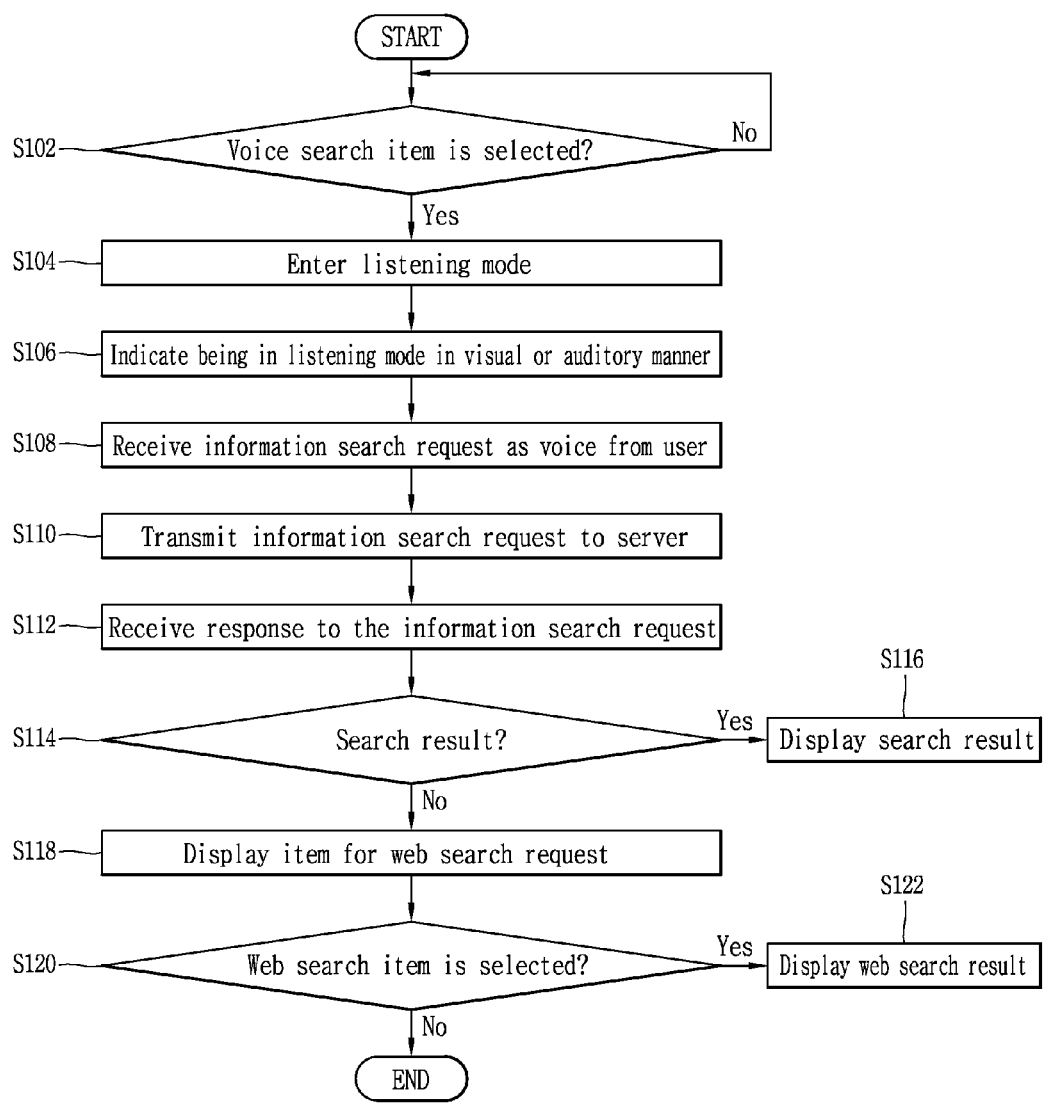
FIG. 4 is a flow chart illustrating a process of allowing the mobile terminal 100 to provide a search result to an information search request entered by a user according to the related art.

FIG. 4 is a flow chart illustrating a process of allowing the mobile terminal 100 to provide a search result to an information search request entered by a user according to the related art. As recognized by the user, the process may be carried out immediately, almost immediately, at a gradual or appropriate speed. If the process is once activated, then the progress of the process may be automatically controlled by a device such as the mobile terminal 100 regardless of the user or controller by the user. The flow of the following process may include numerous operations that seem to occur in a specific sequence, but it should be understood that the process includes a larger or smaller number of operations that can be executed in series or in parallel (using a parallel process or multi-threading environment).

The mobile terminal 100 monitors whether or not to select a voice search item (S102). The voice search item may be displayed according to the user's input as an item (menu or icon) that can be selected by a user. In other words, the mobile terminal 100 does not display a voice search item (for example, hidden on the screen) in a typical state, but displays a voice search item when the user issues a command for displaying the voice search item. Alternatively, the voice search item may be implemented with a hardware button or displayed in a fixed manner on the screen of the mobile terminal 100, thereby allowing the voice search item to be selected by the user under any circumstances.

When the voice search item is selected in step S102, the mobile terminal 100 enters a listening mode (S104). In other words, the microphone 121 is activated, and a function for receiving a voice input is activated. In the listening mode, the mobile terminal 100 receives all voices listening from the outside including the user as an analog signal. The received analog signal is converted into a digital signal subsequent to removing noises or the like through a pre-processing process. The digital signal may be temporarily stored in the memory 160.

Concurrently, the mobile terminal 100 outputs an indicator in a visual or auditory manner (S106). It is to guide the user to issue any command with his or her voice because the mobile terminal 100 is in a listening mode. Accordingly, the mobile terminal 100 may display a phase like "I'm listening" on the screen or output a predetermined notification sound.

The mobile terminal 100 may receive an information search request through a voice input from the user (S108), and transmit the information search request received from the user to the service provider 200 to execute it in an external search engine (S110).

The service provider 200 returns a search result corresponding to a text query (S112). If there is no search result, then the search engine displays a message indicating that there is no search result. The mobile terminal 100 determines whether or not there exists a search result (S114), and displays a search result corresponding to the information search request if there exists a search result (S116). However, if there exists no search result, the mobile terminal 100 displays a message indicating that there is no search result, and displays an item for receiving a response to the information search request from a web server (S118).

The mobile terminal 100 monitors whether or not an item for receiving a response to the information search request from a web server is selected (S120), and transmits the information search request to the web server if the relevant item is selected. The mobile terminal 100 receives a response to the information search request from the web server, and displays a search result contained in the received response (S122). In this case, the search result is provided in a web page format, and a message indicating that there is no search result is displayed on the web page even when there is no search result, and thus it is not additionally required to display that there is no search result.

Figure 5A:
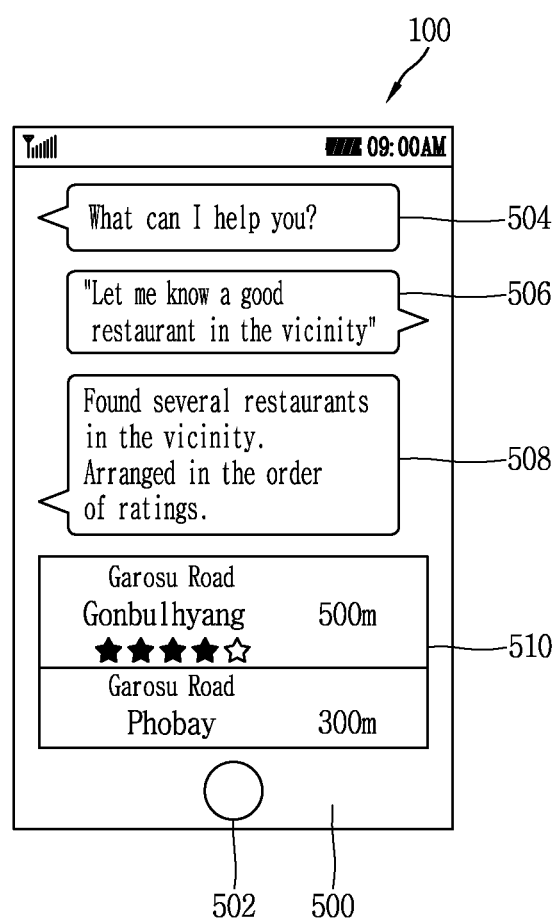
FIGS. 5A through 5C are conceptual views illustrating a process of allowing the mobile terminal 100 to provide a search result to an information search request entered by a user according to the related art.
Figure 5B:
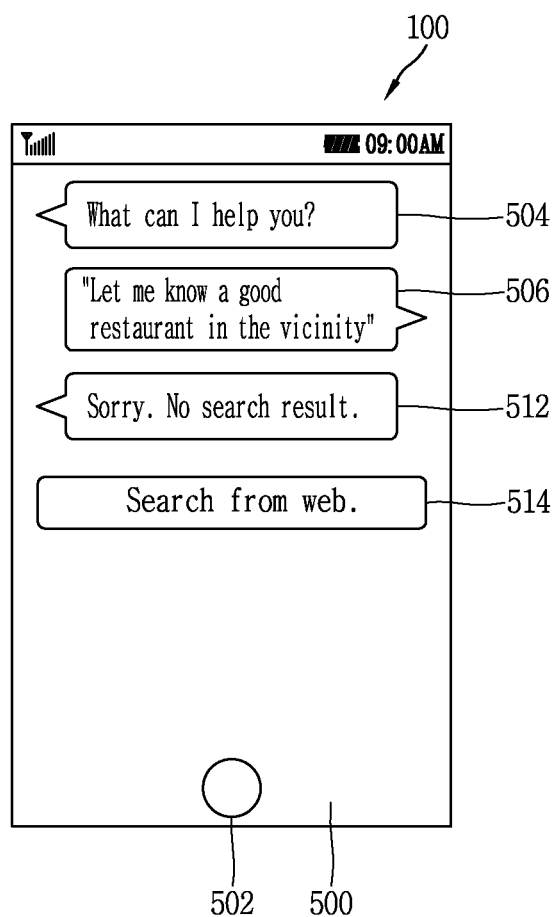
Figure 5C:
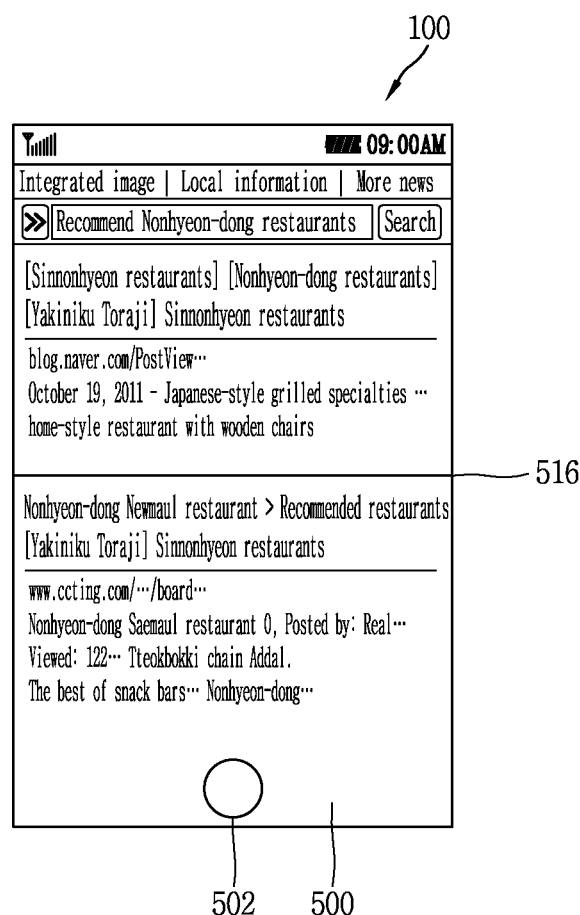

FIGS. 5A through 5C are conceptual views illustrating a process of allowing the mobile terminal 100 to provide a search result to an information search request entered by a user according to the related art.

FIG. 5A is a conceptual view illustrating a screen displayed on the mobile terminal 100 when there exists any search result.

The mobile terminal 100 may display a voice search item 502 on the screen 500 in a fixed manner or according to the user's selection. When the voice search item 502 is selected, the mobile terminal 100 enters a listening mode, and a message 504 indicating that the mobile terminal 100 is in a listening mode on the screen.

The mobile terminal 100 may receive an information search request as a voice from the user because it is in a listening mode. The mobile terminal 100 may display an information search request 506 in a text format corresponding to the information search request in a voice format. For example, the mobile terminal 100 may convert an information search request in a voice format into the information search request 506 in a text format through a voice converter provided therein to display it on the screen 500. Otherwise, the mobile terminal 100 may transmit an information search request in a voice format to the service provider 200, and the service provider 200 may convert the information search request in a voice format into the information retrieval request 506 in a text format to provide it to the mobile terminal 100.

The mobile terminal 100 may transmit an information search request to the service provider 200, and the service provider 200 may extract a query from the information search request, and execute the extracted query in a search engine to acquire a search result from the information provider 300. The search engine may return a search result corresponding to the query when there exists a search result. The service provider 200 may transmit the search result to the mobile terminal 100.

The mobile terminal 100 may display a search result 510 received from the service provider 200 on the screen 500. Here, the search result 510 displayed on the screen 500 may be an optimal search result selected from a plurality of search results through various criteria such as a user's context, use history or the like. The mobile terminal 100 may further display such a selection criteria 508 on the screen 500.

FIG. 5B is a conceptual view illustrating a screen displayed on the mobile terminal 100 when there exists no search result.

The mobile terminal 100 may transfer an information search request to the service provider 200, and the service provider 200 may transmit a message indicating that there is no search result corresponding to the information search request when there exists no search result. The mobile terminal 100 displays an item 514 for transmitting the information search request to a web server while at the same time displaying a message 512 indicating that there is no search result corresponding to the information search request. The item 514 for transmitting the information search request to a web server is an item that is selectable by the user, and the mobile terminal 100 transmits the information search request to the web server if the item 514 for transmitting the information search request to the web server is selected.

FIG. 5C is a conceptual view illustrating a screen displayed on the mobile terminal 100 when a text query is executed in a web server.

As described above, when the mobile terminal 100 transfers an information search request to a web server, the web server transmits a search result page corresponding to the information search request to the mobile terminal 100. The mobile terminal 100 displays a page 516 received from the web server on the screen 500. If there is no search result, the web server transmits a page indicating that there is no search result corresponding to a text query to the mobile terminal 100, and the mobile terminal 100 displays a page indicating that there is no search result on the screen 500.

On the other hand, the service provider 200 is able to acquire a search result from information provided by the information provider 300, and thus the search result is entirely dependent upon information provided by the information provider 300 (When there is no search result, a web search result may be additionally provided, but it may not be useful in many cases compared to a search result provided from the service provider 200.) It may cause the following problem.

First, it cannot get away from a geographical range limit provided by the information provider 300. For example, when a query is based on location information such as regional information, map information or traffic information, information on a region which is not covered by the information provider 300 cannot be provided. It may be extended to language issues, and thus information with a language which is not provided by the information provider 300 cannot be provided.

Second, personal information should be transmitted for search, thereby potentially causing a problem of infringing the privacy of its users. For example, in order to allow the service provider 200 to provide an accurate search result, the mobile terminal 100 should transmit its personal information such as a user's voice input, address and location information to the service provider 200, but there may be privacy concerns when such information is stored by the service provider 200.

Third, it may cause a problem in which information or services that are not supported by the information provider 300 cannot be provided. For example, when the information provider 300 is not linked to a TV channel search service or airline reservation service, it may cause a problem that the relevant function cannot be provided.

Fourth, when there exists an error on the service provider 200 or network 400, information search services cannot be used. It may be possible to provide more information based on the network or reflect new information on a search result in real time, but when it cannot be connected to the network or an error is generated from the service provider 200, it may cause an inconvenience that information search services cannot be used.

As a result, since the information search request is determined based on the quality of the information provider 300, it may be difficult to secure an information provider who provides regional information based services, and customer satisfaction on the information may vary. In order to solve the problem, the present disclosure is to provide a user interactive information search service. Hereinafter, a method of providing a user interactive information search service and a terminal and a server employing the same.

Figure 6:
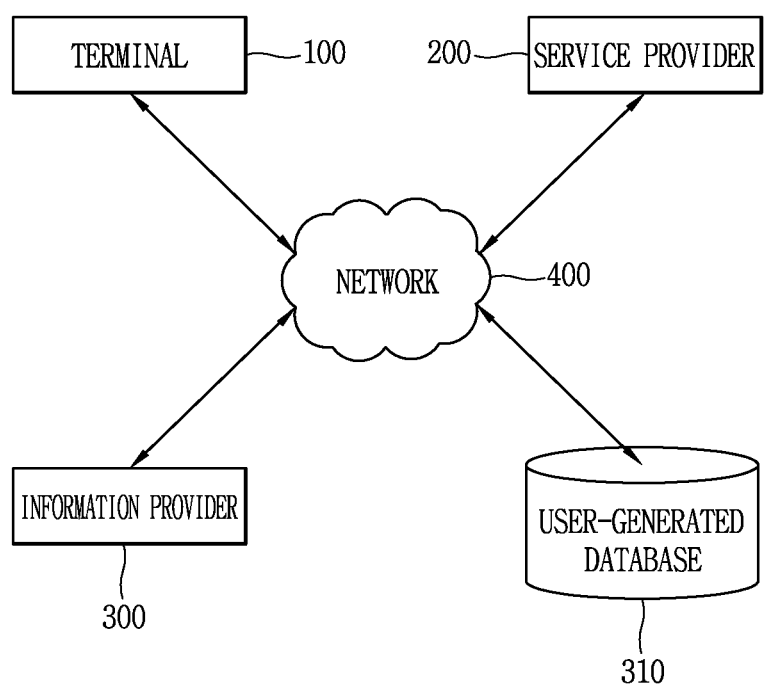
FIG. 6 is a block diagram illustrating an information search system according to the embodiments of the present disclosure.

FIG. 6 is a block diagram illustrating an information search system according to the embodiments of the present disclosure. An information search system according to the embodiments of the present disclosure may include a user-generated database 310 in addition to the mobile terminal 100, the service provider 200, the information provider 300 and the network 400.

The user-generated database 310 denotes a space for storing information directly entered by a user when the service provider 200 is unable to obtain a search result for a query from the information provider 300. Accordingly, the user-generated database 310 stores a user's information search request and a user's response thereto (or user himself or herself or a third party) in connection with each other.

In other words, the user may enter a response to the information search request with his or her voice through the mobile terminal 100, and the mobile terminal 100 transmits the entered response to the service provider 200. The service provider 200 stores the information search request and the entered response in connection with each other. Here, the profile information of the user who enters a response to the information search request or the context information of the mobile terminal 100 such as location information, time information or the like may be stored therein at the same time.

Then, the service provider 200 receives the information search request from the mobile terminal 100, and acquires a search result for a query corresponding to the information search request from the information provider 300. The service provider 200 acquires a search result for a query from the user-generated database 310 when a search result for the query cannot be acquired from the information provider 300. Here, the service provider 200 may acquire a search result for the query from the user-generated database 310 based on the profile information of the user who enters the information search request or the context information of the mobile terminal 100 such as location information, time information or the like.

For example, when a user who enters an information search request is a female in her twenties, a search result for the query may be provided from the user-generated database 310 based on information stored by the female in her twenties. Otherwise, when the user who enters an information search request is located at Gangnam Station, a search result to the query associated with Gangnam Station may be provided from the user-generated database 310.

Figure 7:
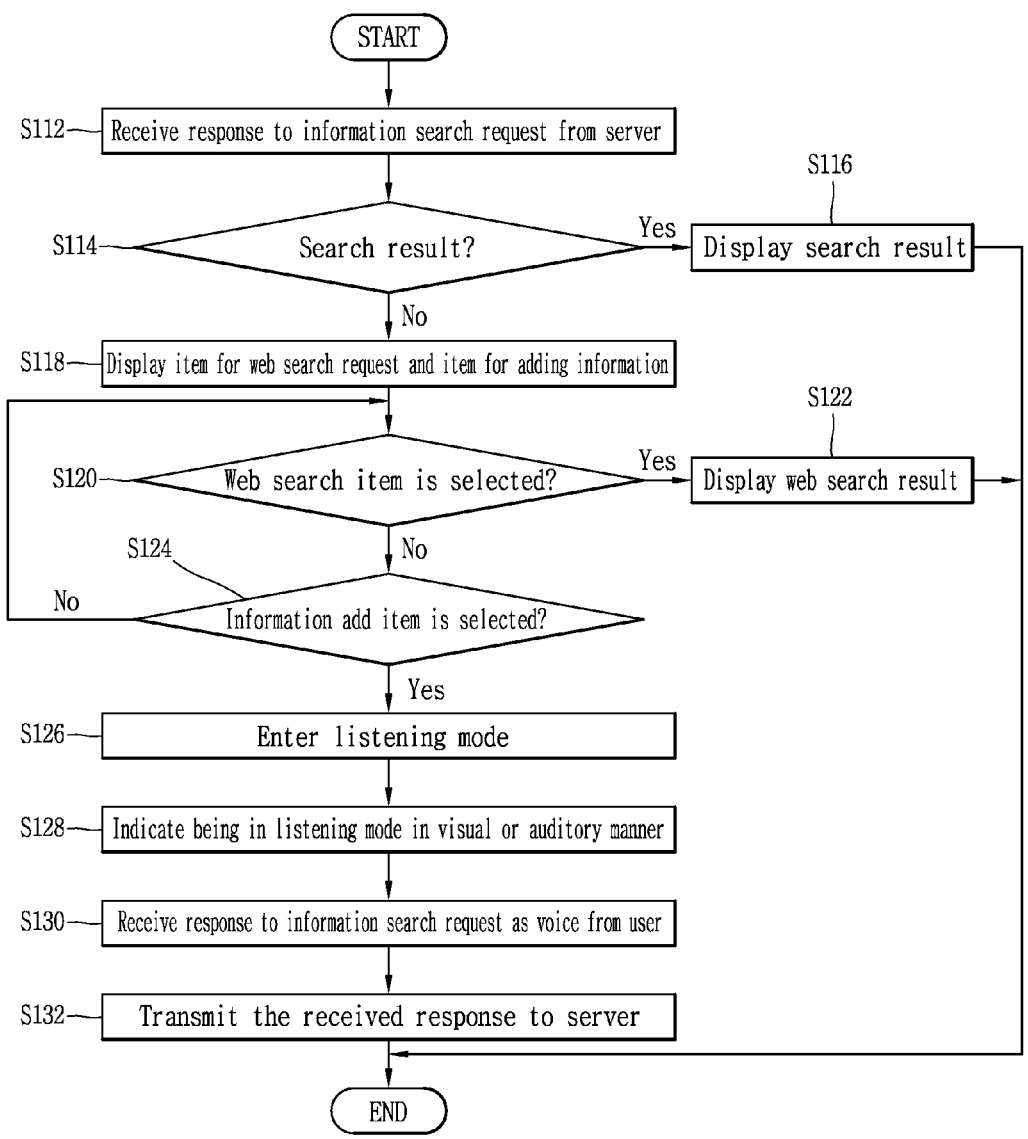
FIG. 7 is a flow chart illustrating a process of allowing the mobile terminal 100 to provide a search result to an information search request entered by a user according to an embodiment of the present disclosure.

FIG. 7 is a flow chart illustrating a process of allowing the mobile terminal 100 to provide a search result to an information search request entered by a user according to an embodiment of the present disclosure. As recognized by the user, the process may be carried out immediately, almost immediately, at a gradual or appropriate speed. If the process is once activated, then the progress of the process may be automatically controlled by a device such as the mobile terminal 100 regardless of the user or controller by the user. The flow of the following process may include numerous operations that seem to occur in a specific sequence, but it should be understood that the process includes a larger or smaller number of operations that can be executed in series or in parallel (using a parallel process or multi-threading environment).

Subsequently to step S110 illustrated in FIG. 4, the mobile terminal 100 receives a response to an information search request from the service provider 200 (S112). Then, the mobile terminal 100 determines whether a search result or a message indicating that there is no search result is contained in the response to the information search request (S114). If a search result is contained in the response to the information search request, the mobile terminal 100 displays the search result (S116).

However, when a search result is not contained in the response to the information search request, the mobile terminal 100 displays an item for allowing the user to add information along with an item for a web search request (S118). Then, the mobile terminal 100 monitors whether or not an item for a web search request is selected (S120), and receives and displays a search result page from the web server (S122).

The, the mobile terminal 100 monitors whether or not an item for allowing the user to add information is selected (S124), and the mobile terminal 100 enters a listening mode when the item for allowing the user to add information is selected (S126), and exhibits the mobile terminal 100 being in a listening mode in a visual or auditory manner (S128).

Then, the mobile terminal 100 receives a response to the information search request as a voice from the user (S130), and transmits the entered response to the service provider 200 (S132). Here, the mobile terminal 100 transmits information on the information search request, for example, a query itself or identification information on the query to the service provider 200 at the same time. Then, the mobile terminal 100 transmits the context information of the mobile terminal 100 such as at least one of the location information and time information of the mobile terminal 100, and the profile information of the user such as the user's gender, age, or the like at the same time.

Though not shown in the drawing, the service provider 200 analyzes (parses) the waveform of a user's voice response received from the mobile terminal 100 to detect its words and semantically analyzes them. Then, the service provider 200 stores the analysis result in the user-generated database 310 along with the query. Here, the service provider 200 stores the profile of the user who makes a response or the context information of the mobile terminal 100 in the user-generated database 310 at the same time.

FIGS. 8A through 8D are conceptual views illustrating a process of allowing the mobile terminal 100 to provide a search result to an information search request entered by a user according to an embodiment of the present disclosure.

Figure 8A:
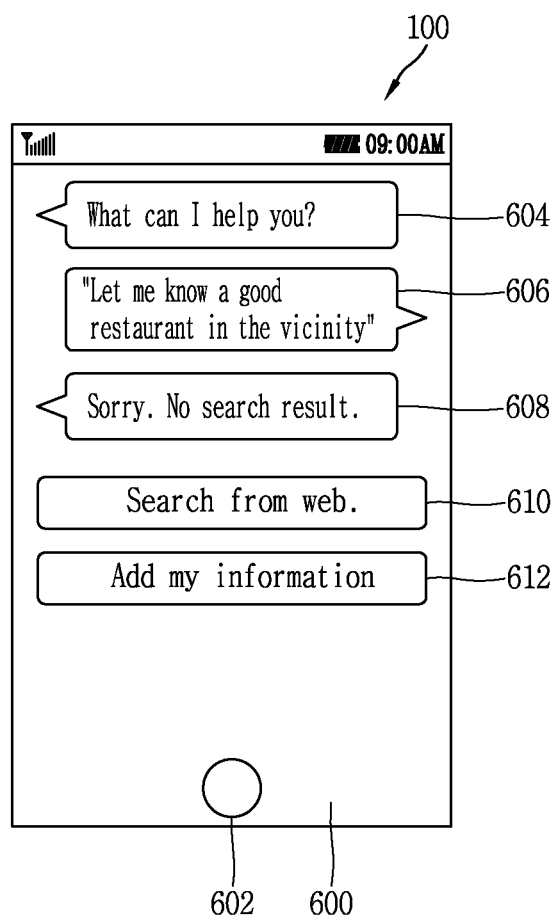
FIGS. 8A through 8D are conceptual views illustrating a process of allowing the mobile terminal 100 to provide a search result to an information search request entered by a user according to an embodiment of the present disclosure.

FIG. 8A is a conceptual view illustrating a screen displayed on the mobile terminal 100 when there exists no search result.

The mobile terminal 100 may display a voice search item 602 on the screen 600 in a fixed manner or according to the user's selection. When the voice search item 602 is selected, the mobile terminal 100 enters a listening mode, and a message 604 indicating that the mobile terminal 100 is in a listening mode on the screen. The mobile terminal 100 may receive an information search request as a voice from the user because it is in a listening mode.

The mobile terminal 100 may transmit an information search request in a voice format to the service provider 200, and receive text corresponding to the information search request in a voice format along with a response to the information search request from the service provider 200. The mobile terminal 100 may display a text query 606 received from the service provider 200 on the screen 600, and also display a response to the information search request received from the service provider 200 on the screen 600. For example, the mobile terminal 100 may display a search result on the screen 600 when the response contains the search result, and display a message 608 indicating that there is no search result on the screen 600 when the response does not contain the search result.

Furthermore, when the response does not contain the search result, the mobile terminal 100 may further display an item 610 for receiving a response to the information search request from a web server and an item 612 for retrieving a response to the information search request from the user-generated database 310. Both the item 610 for receiving a response to the information search request from a web server and the item 612 for retrieving a response to the information search request from the user-generated database 310 may be implemented as selectable items in an individual manner, but one item may be displayed on the screen 600 as an item for executing both a function for receiving a response to the information search request from a web server and a function for retrieving a response to the information search request from the user-generated database 310.

When the item 610 for receiving a response to the information search request from a web server is selected by the user, the mobile terminal 100 display a search result page 516 on the screen 600 as illustrated in FIG. 5C. If the item 612 for retrieving a response to the information search request from the user-generated database 310 is selected by the user, then the mobile terminal 100 enters a listening mode again, and displays a message 614 indicating that the mobile terminal 100 is in the listening mode again on the screen 600.

The mobile terminal 100 receives a user response to the information search request as a voice, and displays the received user response 616 on the screen 600. To this end, the mobile terminal 100 may convert a user response in a voice format into text to display it on the screen 600. Otherwise, if the mobile terminal 100 transmits a user response in a voice format to the service provider 200, and the service provider 200 converts the user response in a voice format into text and transmits it to the mobile terminal 100 again, then the mobile terminal 100 may display the user response in a text format received from the service provider 200 on the screen 600.

Concurrently, the mobile terminal 100 display an item 618 for storing a user response on the screen 600. If the item 618 for storing a user response is selected, the mobile terminal 100 may transmit a request for storing the user response to the service provider 200, and the service provider 200 may store the user response received from the mobile terminal 100 according to the request in the user-generated database 310. Here, the service provider 200 may store the information search request and a user response received from the mobile terminal 100 in connection with each other. Then, the stored user response may be provided to the mobile terminal 100 as a search result to the information search request of the user or another user.

Figure 8B:
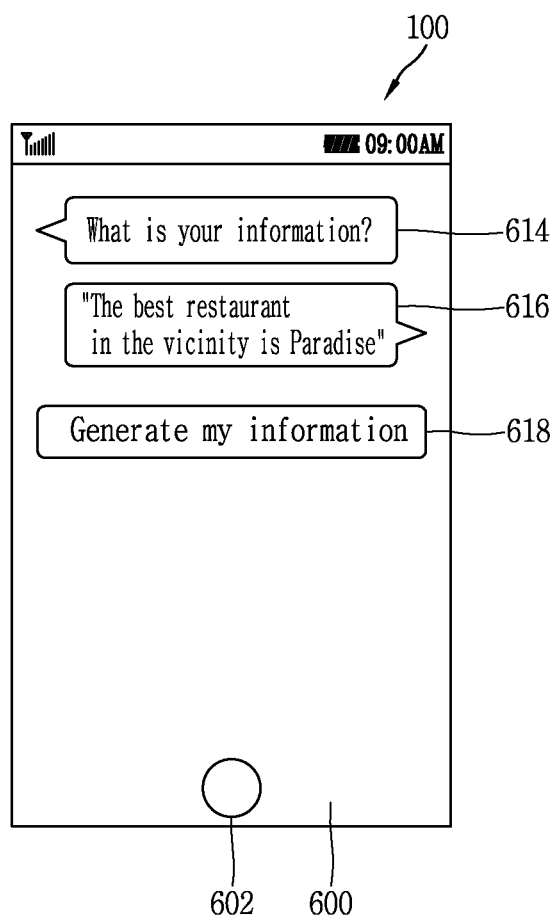
Figure 8C:
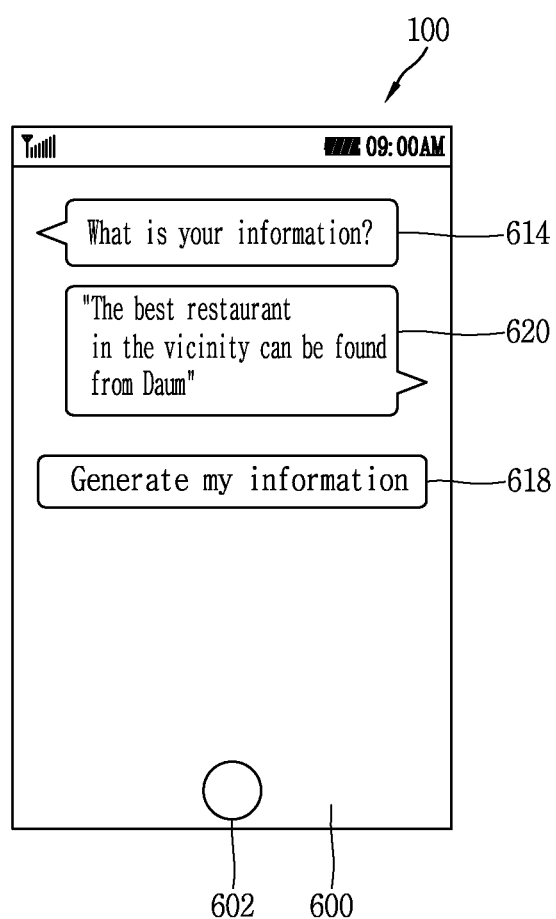

In FIG. 8B, the user enters information itself requested by the information search request, for example, an answer to the question, as a voice. On the contrary, referring to FIG. 8C, the user enters information linked to information requested by the information search request, for example, a method capable of acquiring an answer to the question as a voice. The embodiments of the present disclosure may include both a case where information requested by the information search request is directly provided and a case where information requested by the information search request is indirectly provided through information linked thereto.

During the process, the mobile terminal 100 may provide an interactive interface. In other words, the mobile terminal 100 may display an information search request on the screen 600 through an interactive interface, and in a similar manner, the mobile terminal 100 may display a user response to the information search request on the screen 600.

Figure 8D:
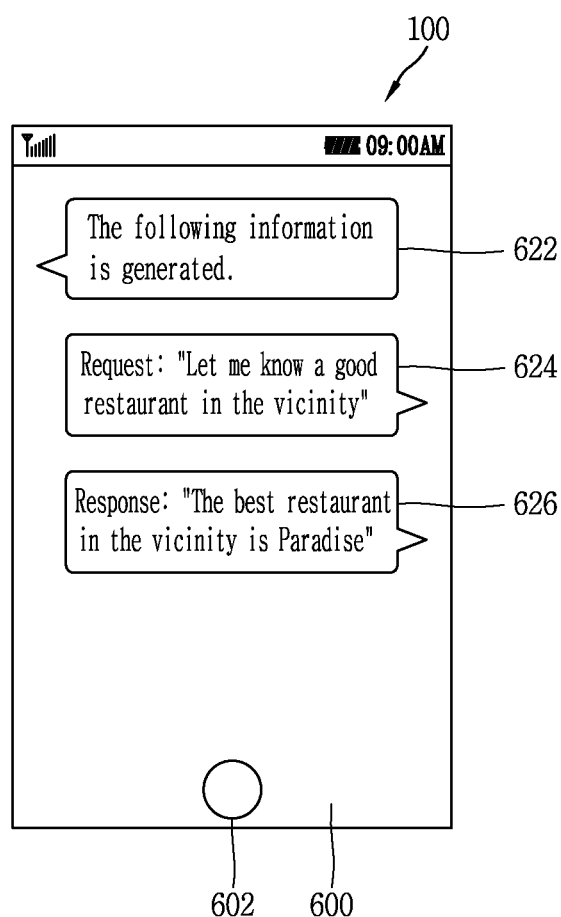

Referring to FIG. 8D, the service provider 200 transmits a response to a request for storing a user response of the mobile terminal 100 to the mobile terminal 100. For example, the service provider 200 may transmit a message indicating that a user response has been successfully stored in the user-generated database 310 to the mobile terminal 100. The mobile terminal 100 may display a message 622 indicating that the user response has been successfully stored in the user-generated database 310 on the screen 600 along with the information search request 624 and user response 626.

Figure 9:
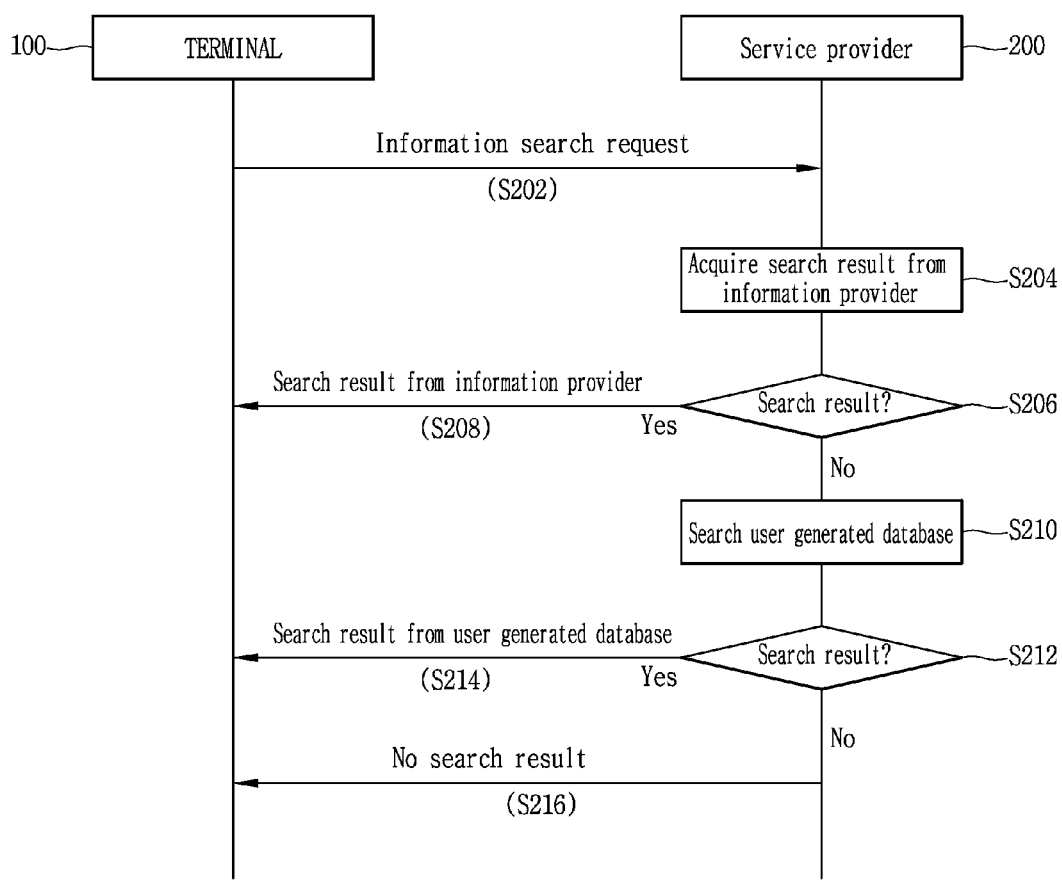
FIG. 9 is a flow chart illustrating a process of allowing the mobile terminal 100 to provide a search result to a query entered by a user according to an embodiment of the present disclosure.

FIG. 9 is a flow chart illustrating a process of allowing the mobile terminal 100 to provide a search result to a query entered by a user according to an embodiment of the present disclosure. As recognized by the user, the process may be carried out immediately, almost immediately, at a gradual or appropriate speed. If the process is once activated, then the progress of the process may be automatically controlled by a device such as the mobile terminal 100 regardless of the user or controller by the user. The flow of the following process may include numerous operations that seem to occur in a specific sequence, but it should be understood that the process includes a larger or smaller number of operations that can be executed in series or in parallel (using a parallel process or multi-threading environment).

The mobile terminal 100 receives an information search request as a voice from a user to transmit it to the service provider 200 (S202). Upon receiving the information search request from the mobile terminal 100 (the service provider 200 converts the information search request into text when the information search request is transferred as a voice), first, the service provider 200 makes an attempt to acquire a search result corresponding to the information search request from the information provider 300 (S204). For example, the service provider 200 executes a query corresponding to the information search request in the information provider 300. Then, the service provider 200 determines whether or not to acquire a search result from the service provider 200 (S206), and transmits the search result acquired from the information provider 300 to the mobile terminal 100 when the search result can be acquired from the information provider 300 (S208).

When the search result cannot be acquired from the information provider 300, the mobile terminal 100 subsequently makes an attempt to acquire the search result from the user-generated database 310 (S210). Then, the service provider 200 determines whether or not to acquire the search result from the user-generated database 310 (S212), and transmits the search result acquired from the user-generated database 310 to the mobile terminal 100 when the search result can be acquired from the user-generated database 310 (S214).

If the search result cannot be acquired from the information provider 300 and user-generated database 310, then the service provider 200 transmits a message indicating that there is no search result to the mobile terminal 100 (S216).

The embodiments of the present disclosure are not dependent on the search sequence, and for example, the service provider 200 makes an attempt to acquire the search result from the user-generated database 310 for the first time, and makes an attempt to acquire the search result from the information provider 300 for the second time or makes an attempt to acquire the search result from the information provider 300 and user-generated database 310 at the same time.

Figure 10A:
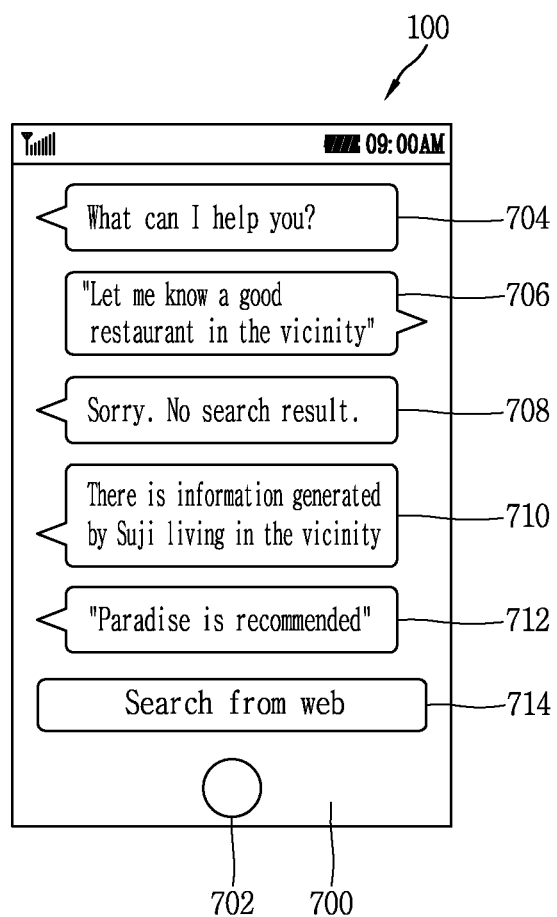
FIGS. 10A and 10B are conceptual views illustrating a process of allowing the mobile terminal 100 to provide a search result to a query entered by a user according to an embodiment of the present disclosure.
Figure 10B:
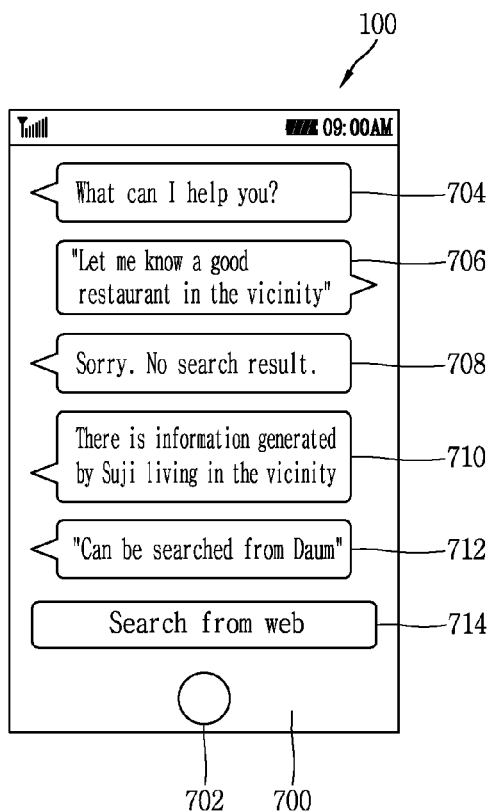

FIGS. 10A and 10B are conceptual views illustrating a process of allowing the mobile terminal 100 to provide a search result to a query entered by a user according to an embodiment of the present disclosure.

The mobile terminal 100 may display a voice search item 702 on the screen 700 in a fixed manner or according to the user's selection. When the voice search item 702 is selected, the mobile terminal 100 enters a listening mode, and a message 704 indicating that the mobile terminal 100 is in a listening mode on the screen. The mobile terminal 100 may receive an information search request as a voice from the user because it is in a listening mode.

The mobile terminal 100 may display an information search request 706 on the screen 700. For example, the mobile terminal 100 may convert the information search request in a voice format into text to display it on the screen 700 or transmit the information search request in a voice format to the service provider 200, and then receive a text converted information search request from the service provider 200 to display it on the screen 700.

Furthermore, the mobile terminal 100 may display a response to the information search request received from the service provider 200 on the screen 700. For example, the mobile terminal 100 may display a search result acquired by the service provider 200 from the information provider 300 on the screen 700 when the response contains the search result acquired from information provider 300, and display a message 708 indicating that there is no search result acquired from the information provider 300 on the screen 700 when the response does not contain the search result acquired from information provider 300.

Furthermore, for example, when the response contains a search result acquired by the service provider 200 from the user-generated database 310, the mobile terminal 100 may display the search result 712 acquired by the service provider 200 from the user-generated database 310 on the screen 700. Here, the mobile terminal 100 may acquire the description 710 of the search result 712 acquired by the service provider 200 from the user-generated database 310, for example, the context or user profile of the mobile terminal 100 that has provided the relevant search result 712 to display it on the screen 700.

In FIG. 10A, the mobile terminal 100 receives information itself requested by the information search request from the service provider 200, for example, an answer to the question, to provide it to the user. On the contrary, referring to FIG. 10B, the mobile terminal 100 receives information linked to information requested by the information search request from the service provider 200, for example, a method capable of acquiring an answer to the question to display it to the user. The embodiments of the present disclosure may include both a case where information requested by the information search request is directly provided and a case where information requested by the information search request is indirectly provided through information linked thereto.

Figure 11:
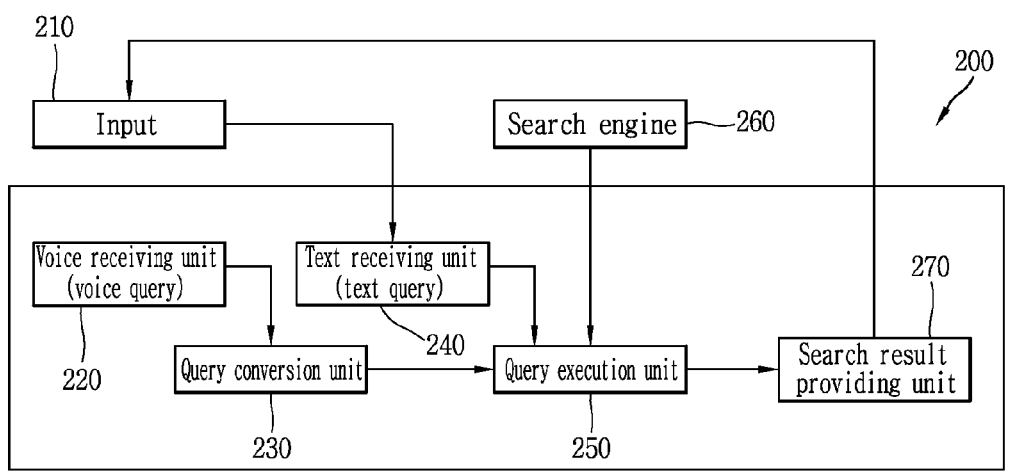
FIG. 11 is a conceptual view illustrating a process of allowing a service provider 200 to provide a search result to an information search request received from the mobile terminal 100 according to an embodiment of the present disclosure.

FIG. 11 is a conceptual view illustrating a process of allowing a service provider 200 to provide a search result to an information search request received from the mobile terminal 100 according to an embodiment of the present disclosure.

According to an embodiment, a voice query corresponding to the information search request received from the mobile terminal 100 is converted into a text query prior to being executed in a search engine. For example, a voice query received from the mobile terminal 100 through an audio input component such as a microphone may be recognized as text prior to executing the query in at least one search engine 260 including a text search engine configured to process a text query.

The service provider 200 is configured to receive an information search request from the mobile terminal 100, and receive and process a voice query or text query corresponding to the information search request. The voice receiving unit 220 is activated to receive a voice query, and the text receiving unit 240 is activated to receive a text query. However, the search engine 260 that executes a query may include a text search engine configured to receive only a text query. Therefore, the service provider 200 may include a query conversion unit 230, wherein the query conversion unit 230 is configured to receive a voice query, and recognize it as a text query. The text query is transferred to a query execution unit 250 for subsequent processes.

The service provider 200 performs an additional process to enhance the reception and processing of a query. For example, the service provider 200 is configured to receive a voice query, but it may be difficult to identify some of the terms in the voice query due to pronunciation variation. Accordingly, a voice query term database containing a range of pronunciation of the terms may be mutually linked to a typical query term representing technologies associated with query terms pronounced in a variable manner. The voice query term database may be used to mutually link a voice term of the voice query to a text term allowed in the text query to transmit it to the search engine 260. The query conversion unit 230 may therefore identify a voice query term in the voice query term database and convert the voice query term into a typical text query term, thereby converting a voice query to a text query.

Alternatively or additionally, the processing of a query may be implemented by parsing the query according to a language model according to the domain of the query. For example, the language model may be devised to process a voice query according to a language that can be typically used while the user speaks a voice query.

Figure 12:
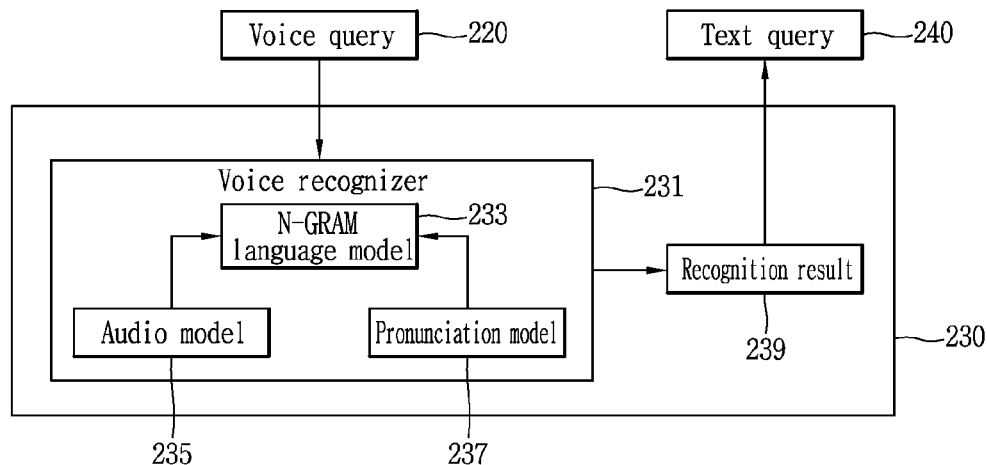
FIG. 12 is an exemplary embodiment for processing the reception of a voice query according to a voice recognizer 231.

FIG. 12 is an exemplary embodiment for processing the reception of a voice query according to a voice recognizer 231. The voice recognizer 231 may include an n-gram language model 233, and it is configured to identify a query term based on a word in a common triple language sequence within the language model. The n-gram language model 233 may be trained to recognize the query term of a voice query using a text query corresponding to the voice query set as a training set, and used to identify the voice term of the voice query according to the word of the language model. The voice recognizer 231 may include a pronunciation model 237 containing the pronunciation expression of various query terms of the voice query. Furthermore, the voice recognizer 231 may include an audio model 235 for identifying phonemes from an audio input containing the voice query. Phonemes identified by the audio model 235 can be matched to individual query terms according to the pronunciation model 237, and parsed into query terms having a high statistical probability. The voice recognizer 231 may therefore generate a recognition result that can be provided as a result including the text query.

Furthermore, a query converted or recognized while converting the voice query to a text query may be inaccurate enough to be dependent thereon. For example, the voice query converted into a terminal may not be sufficiently accurate. Therefore, the service provider 200 may be configured to allow the user to check the converted query subsequent to converting the query and prior to executing the converted query in the search engine 260. The converted query may be executed in the search engine 260 when the converted query is confirmed by the user, but an alternative parsing may be proposed when the converted query is not confirmed by the user, and/or the user may enter a query again. A person skilled in the art may devise various improved embodiments associated with the reception and normalization in implementing technologies disclosed herein.

A second aspect, varying in the embodiments of the technologies, relates to a database on which a query can be executed. For a first example, various search engines 260, for example, a web search engine configured to search a web page on the Internet or other networks, a file search engine configured to search files stored on a local or network file system, an object search engine configured to search objects stored in a device, or a database search engine configured to search a record of the database may be configured to cover various data sources. For a second example, various search engines may be configured to accommodate different types of queries such as a natural language query, a keyword query, a mathematical query, or a query written with a programming language, for example. For a third example, various search engines 260 may support various logical configurations such as field based limit, Boolean logic, or programming logic. Many types of queries may be executed in various types of search engines 260 while implementing technologies disclosed herein.

If a text query is executed in the search engine 300, then the search engine 260 returns search results to the query execution unit 250. The search results may be acquired from data sources such as a web page, a file, an object, a record, or the like. The search results may be linked to each domain, wherein a domain may be defined in advance as an index indicating a general category to which any search result can be linked. However, the domain may be newly generated according to an attribute of the search result even when it is not covered within a predefined range. The domain may be acquired by identifying meaning information associated with a subject contained in the search result. For example, various types of content may include metadata for identifying a meaning contained in the content, namely, an email address, a mail address or phone number, contact information such as a byname used in message services, and the like. The service provider 200 may accompany a process of reading such meaning information from the metadata to match it to a predefined query domain.

Alternatively, the domain may be acquired by a particular identifiable attribute of the search result. For example, the search result may be matched to a domain through regular expressions, heuristics, machine-learning classifies or pattern matching technologies when typically structured like a name such as a combination of two or more words in which the first letter is a capital letter. Otherwise, the domain may be a key factor serving during a process of retrieving a search result. For example, a name mentioned in the title of the search or significantly mentioned in the associated content may be estimated as the domain. Otherwise, a natural language parser may be used to evaluate the content and select a domain for the search result. Otherwise, a neural network or statistical classifier such as a Bayesian classification function may be used to determine the domain of the search result. For example, the domain may be determined by identifying a domain on which the URL is clicked by the user.

Figure 13A:
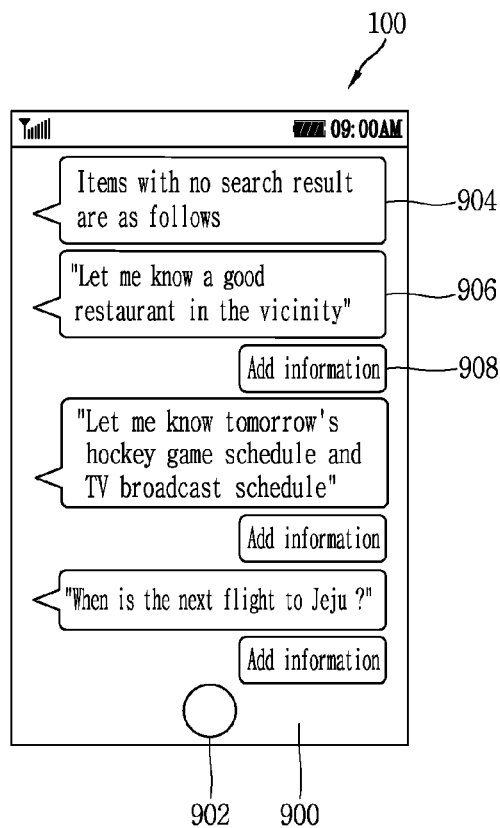
FIGS. 13A and 13B are conceptual view for explaining a process of allowing the mobile terminal 100 to provide a voice interface for entering a user response to an information search request according to another embodiment disclosed in the present disclosure.
Figure 13B:
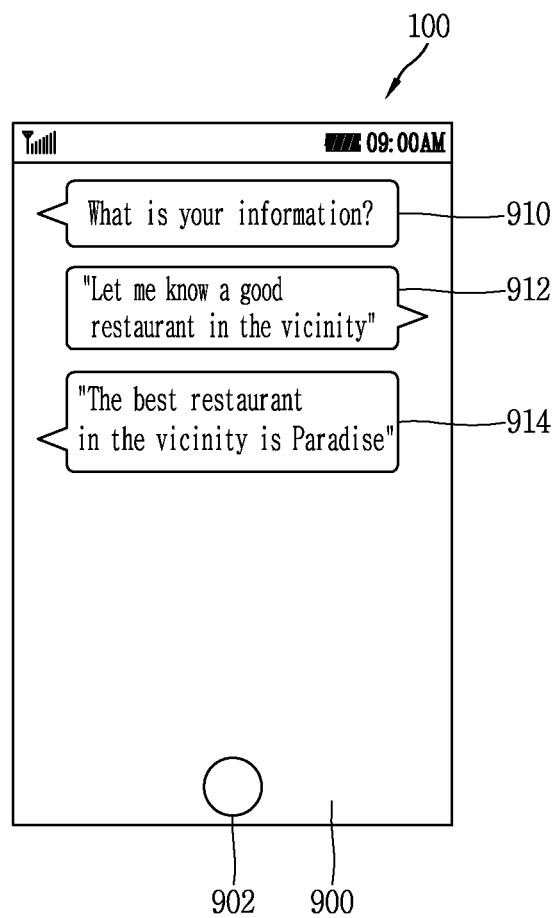

FIGS. 13A and 13B are conceptual view for explaining a process of allowing the mobile terminal 100 to provide a voice interface for entering a user response to an information search request according to another embodiment disclosed in the present disclosure.

Embodiments illustrated in FIGS. 13A and 13B are directed to provide an interface capable of allowing the user of the mobile terminal 100 to directly enter a user response when a response to an information search request from the service provider 200 indicates that there is no search result.

Upon receiving an information search request, the mobile terminal 100 transmits the information search request to the service provider 200, and receives a response to the information search request from the service provider 200. Furthermore, when the response to the information search request contains a search result, the mobile terminal 100 displays a search result on the screen. However, when the response to the information search request does not contain a search result, namely, when the response to the information search request indicates that there is no search result, the mobile terminal 100 stores the information search request in the memory 160. Then, the mobile terminal 100 receives another information search request from the user, and similarly processes another information search request that has been received.

When the user selects an item for displaying an information search request for which there has been no search result, the mobile terminal 100 displays at least one information search request 906 for which there has been no search result along with a guide message 904 as illustrated in FIG. 13A. Furthermore, an item 908 for adding a user response to the information search request 906 is further displayed on each information search request 906. The item 908 for adding a user response may be a user selectable item.

Referring to FIG. 13B, when the item 908 for adding a user response is selected by the user, the mobile terminal 100 enters a listening mode, and subsequently display an information search request 912 corresponding to the selected item 908 along with a message 910 indicating that the mobile terminal 100 is in the listening mode. The user enters a user response to the information search request 912 as a voice, and the mobile terminal 100 displays the entered user response on the screen 900. Furthermore, the mobile terminal 100 requests the service provider 200 to store the entered user response 914 along with the information search request 912. The service provider 200 stores the user response 914 and information search request 912 in connection with each other, and transmits the stored result to the mobile terminal 100.

Figure 14A:
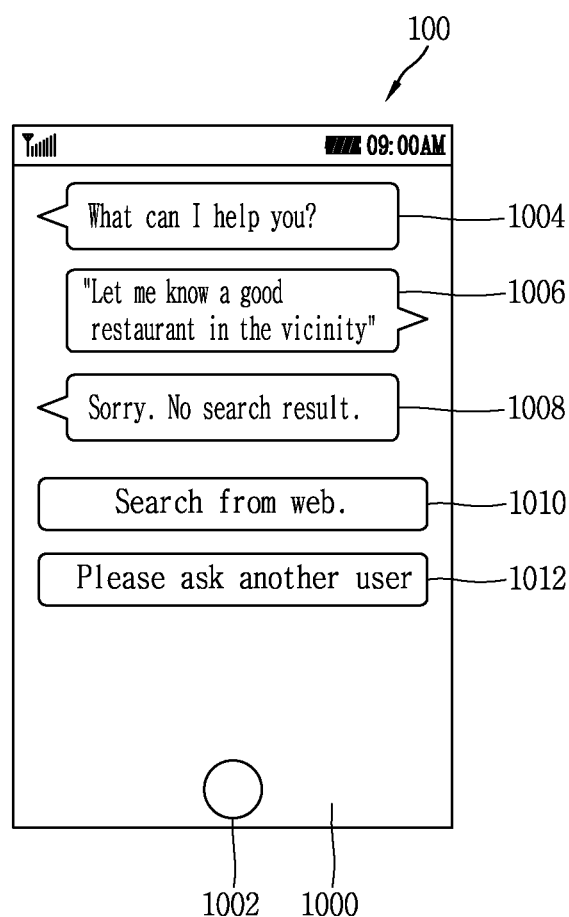
FIGS. 14A and 14B are conceptual views for explaining a process of allowing the mobile terminal 100 to provide a voice interface for entering a user response to an information search request according to still another embodiment disclosed in the present disclosure.
Figure 14B:
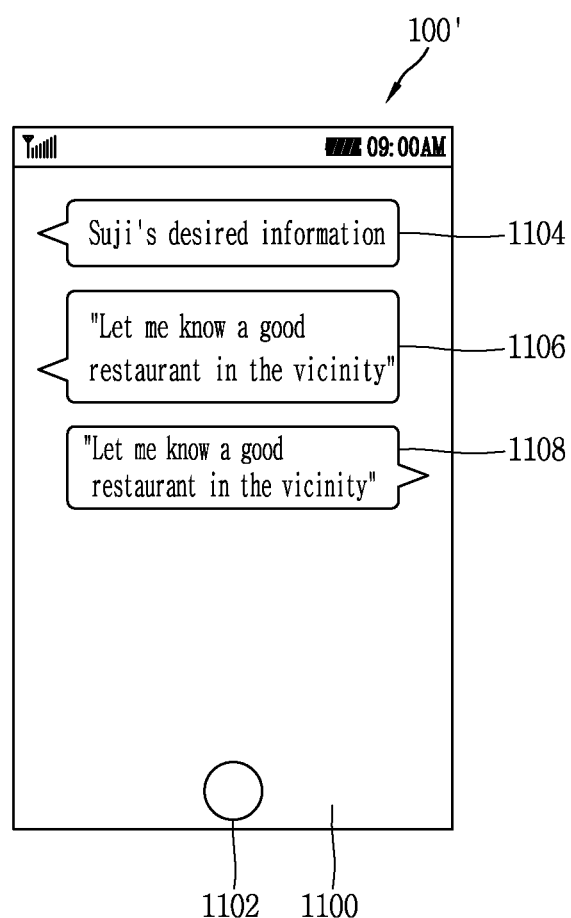

FIGS. 14A and 14B are conceptual views for explaining a process of allowing the mobile terminal 100 to provide a voice interface for entering a user response to an information search request according to still another embodiment disclosed in the present disclosure.

Embodiments illustrated in FIGS. 14A and 14B are directed to provide an interface capable of allowing the user of the mobile terminal 100 to enter a user response upon receiving a message requesting the user response from an external terminal.

Referring to FIG. 14A, when a voice search item 1002 is selected to enter a listening mode, the mobile terminal 100 displays a message 1004 indicating that the mobile terminal is in the listening mode. Furthermore, upon receiving an information search request from the user, the mobile terminal 100 display the information search request 1006 on the screen 1000. The mobile terminal 100 transmits the information search request to the service provider 200, and receives a response to the information search request from the service provider 200. Furthermore, when the response to the information search request contains a search result, the mobile terminal 100 displays the search result on the screen.

However, when the response to the information search request does not contain a search result, namely, when the response to the information search request indicates that there is no search result, the mobile terminal 100 displays a message 1008 indicating that there is no search result on the screen 1000. Concurrently, the mobile terminal 100 displays an item 1010 for receiving a response to the information search request from a web server and an item 1012 for receiving a response to the information search request from a user of the external terminal on the screen 1000.

Referring to FIG. 14B, the external terminal 100' enters a listening mode while receiving the information search request using a push notification service (or inquiry service) from the mobile terminal 100, and displaying the information search request 1106 and the description 1104 of the information search request 1106 on the screen 1100. The external terminal 100' receives a user response to the information search request as a voice from the user, and transmits the received user response to the mobile terminal 100 again.

Therefore, it should be understood that the foregoing embodiments are merely illustrative but not restrictive in all aspects. The scope of the present invention is defined by the appended claims rather than by the detailed description, and all changes or modifications derived from the meaning, scope and equivalent concept of the claims should be construed to be embraced by the scope of the present invention.

The invention claimed is:

1. A method of providing a user interface in a terminal, the method comprising:
   transmitting a specific information search request to a server based on a user's voice input;
   receiving a first response from the server in response to the specific information search request;
   displaying an item for receiving voice as a second response related to the specific information search request when the first response indicates no search result;
   displaying a screen for receiving the second response when the item is selected;
   receiving the second response via the displayed screen;
   transmitting the received second response to the server; and
   displaying the second response as text when the specific information search request is received from the user after the received second response is transmitted to the server.

2. The method of claim 1, wherein the second response is received while also receiving a web search result from the server in response to the specific information search request.

3. The method of claim 1, further comprising:
   displaying an item for receiving a web search result from the server in response to the information search request.

4. The method of claim 1, further comprising:
   acquiring at least location information or time information related to terminal; and
   transmitting the acquired at least location information or time information to the server.

5. The method of claim 1, further comprising:
   acquiring profile information related to the user; and
   transmitting the acquired profile information to the server.

6. The method of claim 1, wherein the second response comprises information requested by the specific information search request or information linked to information requested by the specific information search request.

7. The method of claim 1, further comprising:
   transmitting the specific information search request to an external terminal when the item is selected; and
   receiving the second response from the external terminal.

8. The method of claim 1, wherein the information search request is received from the user as voice.

9. The method of claim 8, further comprising:
   storing the information search request received from the user as voice when a response to the received information search request indicates no search result.

10. The method of claim 1, wherein the information search request is received from an external terminal using a push notification service.

11. A method of providing a user interface in a terminal, the method comprising:
    displaying at least one information search request for which a response from a server indicates no search result;
    displaying an item for receiving a user voice response related to the displayed at least one information search request;
    displaying a screen for receiving the voice response when the item is selected;
    receiving the voice response via the displayed screen;
    transmitting the received voice response to the server; and displaying the received voice response as text when the at least one information search request is received from the user after the received voice response is transmitted to the server.

12. The method of claim 11, wherein the at least one information search request is received from the user as voice.

13. The method of claim 12, further comprising:
storing the at least one information search request received from the user as voice when the response to the received information search request indicates no search result.

14. The method of claim 11, wherein the at least one information search request is received from an external terminal.

15. The method of claim 14, wherein the at least one information search request is received from the external terminal using a push notification service.

16. The method of claim 11, wherein the voice response is received while also receiving a web search result from the server in response to the specific information search request.

17. The method of claim 11, further comprising:
acquiring at least location information or time information related to terminal; and
transmitting the acquired at least location information or time information to the server.

18. The method of claim 11, further comprising:
acquiring profile information related to the user; and
transmitting the acquired profile information to the server.

19. The method of claim 11, wherein the user voice response comprises information requested by the information search request or information linked to information requested by the information search request.

20. The method of claim 11, further comprising:
transmitting the information search request to an external terminal when the item is selected; and
receiving the voice response from the external terminal.

* * * * *